United States Patent [19]

Kumagai et al.

[11] Patent Number: 4,797,512

[45] Date of Patent: Jan. 10, 1989

[54] BRANCH WIRE PROTECTOR

[75] Inventors: Fumio Kumagai; Toshio Okazaki, both of Toyota, Japan

[73] Assignee: Yazaki Corporation, Japan

[21] Appl. No.: 137,662

[22] Filed: Dec. 24, 1987

[30] Foreign Application Priority Data

Dec. 25, 1986 [JP] Japan ............................ 61-198255[U]

[51] Int. Cl.[4] .............................................. H02G 3/02
[52] U.S. Cl. .................................. 174/135; 174/71 R; 174/72 A; 174/92; 285/156
[58] Field of Search ................. 174/71 R, 72 R, 72 A, 174/92, 135; 285/156, 373, 419

[56] References Cited
U.S. PATENT DOCUMENTS 3,711,633 1/1973 Ghirardi et al. ..................... 174/135

Primary Examiner—Laramie E. Askin
Attorney, Agent, or Firm—Wigman & Cohen

[57] ABSTRACT

To increase strength of a branch wire protector including a T-shaped semicylindrical member with a trunk portion and a branch portion; a trunk semicylindrical member with a semicylindrical base portion; a branch semicylindrical member; and locking member for locking the trunk and branch semicylindrical members to the T-shaped semicylindrical member, a clinch projection member is formed at an inner end surface of the branch semicylindrical member and a mated clinch hole is formed in the semicylindrical base portion of the trunk semicylindrical member.

5 Claims, 2 Drawing Sheets

BRANCH WIRE PROTECTOR

BACKGROUND OF THE INVENTION

1. Field of the Invention

The present invention relates to a branch wire protector for protecting a branch portion of a wire harness and simultaneously fixing the branch portion to an automotive vehicle body, for instance.

2. Description of the Prior Art

A wire harness including a trunk wire bundle portion and a number of branch wire bundle portions is arranged in an automative vehicle body, for instance, to connect a plurality of electric or electronic devices or appliances arranged on the vehicle body. Each branch portion of the wire harness is usually protected by a branch wire protector. This wire protector is of split-type T-shaped cylindrical member. In use, the protector is split or opened into semicylindrical members; a branch wire is fitted to the T-shaped semicylindrical member; and the T-shaped cylindrical member is closed and further locked by appropriate locking members.

In the prior-art branch wire protector, however, when an external force is applied to the protector via the wire harness, in particular, via the branch wire, since there exists a gap between two split semicylindrical members near the junction point of the T-shaped member, there inevitably exists a problem in that the branch portion of the protector is weak in strength and therefore bent or broken easily by an external force applied thereto via the branch wire.

The arrangement of the prior-art branch wire protector will be described in further detail hereinafter with reference to the attached drawings under detailed description of the preferred embodiments.

SUMMARY OF THE INVENTION

With these problems in mind, therefore, it is the primary object of the prevent invention to provide a branch wire protector which is strong against external force near the junction point of the protector.

To achieve the above-mentioned object, a branch wire protector of the present invention comprises: (a) a T-shaped semicylindrical member having a trunk portion and a branch portion; (b) a trunk semicylindrical member openably joined to the trunk portion of said T-shaped semicylindrical member and having a semicylindrical base portion near a junction point of the trunk portion and the branch portion; (c) a branch semicylindrical member openably joined to the branch portion of said T-shaped semicylindrical member; (d) locking members for locking said trunk semicylindrical member and said branch semicylindrical member to said T-shaped semicylindrical member; and (e) means for clinching said branch semicylindrical member to said trunk semicylindrical member near the junction point of the trunk portion and the branch portion of said T-shaped semicylindrical member.

The clinching means comprises (a) a clinch projection member formed at an inner end surface of the branch semicylindrical member; and (b) a clinch hole formed in the semicylindrical base portion of the trunk semicylindrical member.

BRIEF DESCRIPTION OF THE DRAWINGS

The features and advantages of the branch wire protector according to the present invention will be more clearly appreciated from the following description of the preferred embodiments of the invention taken in conjunction with the accompanying drawings in which like reference numerals designate the same or similar elements and sections throughout the figures thereof and in which:

FIG. 1 (B) is a perspective view showing the same protector as shown in FIG. 1 (A) in an open (split) condition before use;

FIG. 3 (B) is a similar enlarged partial view showing another modification of the engagement relationship between the two; and FIG. 3 (C) is a similar enlarged partial view showing another modification of the engagement relationship between the two.

DETAILED DESCRIPTION OF THE PREFERRED EMBODIMENTS

Figures 1A, 1B:
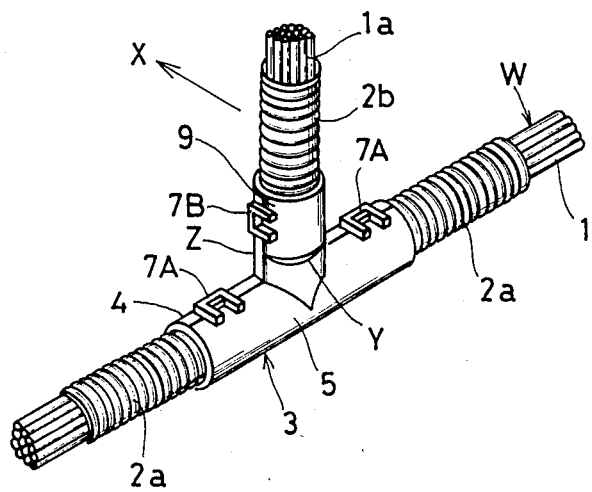
FIG. 1 (A) is a perspective view showing a prior-art branch wire protector fitted to a branch wire harness.

To facilitate understanding of the present invention, a brief reference will be made to a prior-art branch wire protector, with reference to the attached drawings.

FIG. 1 (A) shows a prior-art branch wire protector fitted for use to a branch portion of a wire harness; and FIG. 1 (B) shows the same branch wire protector before use for the wire harness.

In FIG. 1 (A), a wire harness W is composed of a trunk wire bundle 1 and a branch wire bundle 1a branched from the trunk wire bundle 1. The wire bundles 1 and 1a are both covered by corrugated protectors 2a and 2b for protection against damage caused when these wire bundles are brought into contact with edge portions of the vehicle body, for instance. To further protect these corrugated protectors 2a and 2b and to fix these protectors to the vehicle body, a resin branch wire protector 3 is attached to the branch portion of the wire harness W. As shown in FIG. 1 (A), the branch wire protector 3 includes a T-shaped semicylindrical member 4. As depicted in FIG. 1 (B), the T-shaped semicylindrical member 4 is formed by bisecting a T-shaped cylindrical tube into two so as to include a trunk semicylindrical portion 4a and a branch semicylindrical portion 4b. The trunk semicylindrical member 5 is formed with a semicylindrical base portion 5a at the middle thereof.

The trunk semicylindrical member 5 is openably joined to the trunk portion 4a of the T-shaped semicylindrical member 4 via a hinge 6A formed integral with these two semicylindrical members 4 and 5. Further, the branch semicylindrical member 9 is openably joined to the branch portion 4b of the T-shaped semicylindrical member 4 via another hinge 6B formed integral with these two semicylindrical members 4 and 9.

The trunk semicylindrical member 5 is locked to the trunk portion 4a of the T-shaped semicylindrical member 4 by engaging two U-shaped recessed members 7A with two I-shaped projection members 8A. Similarly, the branch semicylindrical member 9 is locked to the branch portion 4b of the T-shaped member 4 by engaging another U-shaped recessed member 7B with another I-shaped projection member 8B.

In use, the trunk and branch semicylindrical members 5 and 9 are separated open from the T-shaped semicylindrical member 4; a branch wire harness is fitted to the inner space of the T-shaped semicylindrical member 4; the two trunk and branch semicylindrical members 5 and 9 are closed; and the U-shaped recessed members 7A and 7B are engaged with the I-shaped projection members 8A and 8B into locked condition.

In the above-mentioned prior-art protector shown in FIGS. 1 (A) and 1 (B), when an external force is applied to the branch wire bundle 1a in the arrow direction X, there exists such a trouble that the branch portion 4b of the T-shaped semicylindrical member 4 is subjected to bending and therefore damaged, because a gap Y inevitably exists between the lower end surface of the branch semicylindrical member 9 and the upper end surface of the semicylindrical base portion 5a of the trunk semicylindrical member 5.

Figure 2:
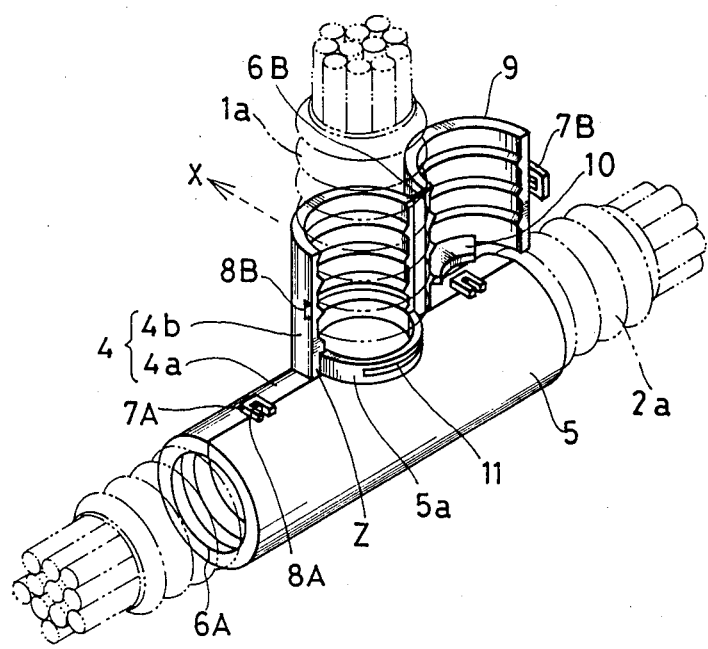
FIG. 2 is a perspective view showing an embodiment of the branch wire protector of the present invention.
Figures 3A, 3B, 3C:
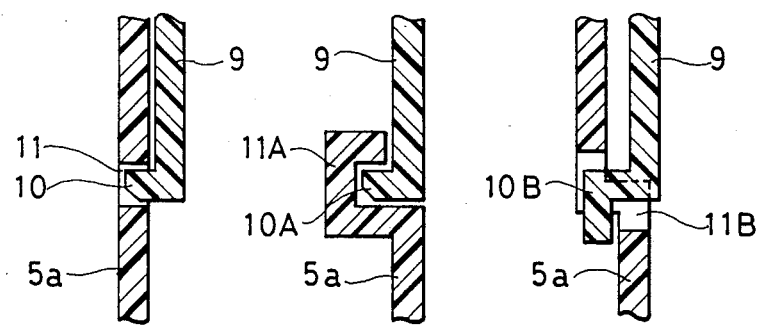
FIG. 3 (A) is an enlarged partial cross-sectional view showing an engagement relationship between the clinch member and the clinch hole both formed near the junction point of the protector.

In view of the above description, reference is now made to an embodiment of the branch wire protector according to the present convention, with reference to FIGS. 2 and 3(A), (B) and (C).

In FIG. 2, the branch wire protection of the present invention comprises a T-shaped semicylindrical member 4 formed with a trunk portion 4a and a branch portion 4b; a trunk semicylindrical member 5 openably joined to the trunk portion 4a of T-shaped semicylindrical member 4 via a hinge 6A formed integral with these semicylindrical members 4 and 5; and a branch semicylindrical member 9 openably joined to the branch portion 4b of the T-shaped semicylindrical member 4 via another hinge 6B formed integral with these two semicylindrical members 4 and 9, in a same way as in the prior-art branch wire protector shown in FIGS. 1(A) and 1(B).

Further, the trunk semicylindrical member 5 is locked to the trunk portion 4a of the T-shaped member 4 by engaging two U-shaped recessed members 7A with two I-shaped projection members 8A. Similarly, the branch semicylindrical member 9 is locked to the branch portion 4b of the T-shaped member 4 by engaging another U-shaped recessed member 7B with another I-shaped projection member 8B.

Being different from the prior-art branch wire protector, the branch wire protector of the present invention further comprises a clinch projection member 10 formed at the inner lowermost end of the branch semicylindrical member 9, and a clinch recessed member (hole) 11 formed in a semicylindrical base portion 5a of the trunk semicylindrical member 5 so as to be engageable with the clinch projection member 10.

In FIG. 2, only a single pair of clinch projection member 10 and clinch hole 11 is shown. However, it is of course possible to form a plurality of pairs of clinch member and clinch hole on the branch semicylindrical member 9 and the trunk semicylindrical member 5, respectively.

Therefore, when the branch semicylindrical member 9 is locked to the branch portion 4b of the T-shaped semicylindrical member 4 by means of the locking means (the U-shaped recessed member 7B and the I-shaped projection member 8B), the clinch projection member 10 is fitted to the clinch hole 11.

Therefore, even if an external force is applied to the branch wire bundle 1a in the arrow direction X, since the lowermost end surface of the branch semicylindrical member 9 is held or supported by the semicylindrical base portion 5a of the trunk semicylindrical member 5 in dependence upon the engagement relationship between the clinch projection member 10 and the clinch hole 11, as shown in the FIG. 3(A), it is possible to securely reinforce the base portion Z of the branch portion 4b of the T-shaped semicylindrical member 4, thus preventing the protector from being bent or damaged near the junction point of the branch wire protector.

FIG. 3(B) shows another modification of the clinch projection member 10 and the clinch recessed member 11. In this case, the clinch projection member 10A is formed at the lowermost end of the branch semicylindrical member 9 so as to extend along the entire semicircular circumference of the branch member 9. Further, the clinch recessed member 11A is formed into a semiannular groove of U-shape in cross section. In this modification, since the entire lower end surface of the branch semicylindrical member 9 is supported by the base portion 5a of the trunk semicylindrical member 5, it is possible to further increase the reinforcement strength.

FIG. 3(C) shows still another modification of the clinch projection member 10 and the clinch recessed member 11. In this case, the clinch projection member 10B is formed into an L-shape in cross section. Further, the clinch recessed member 11B is formed into a stepped hole. In this modification, the L-shaped clinch projection member 10B and the stepped clinch recessed member 11B serve not only as a supporting member, but also as a locking member between the branch semicylindrical member 9 and the T-shaped semicylindrical member 4.

As described above, in the branch wire protector according to the present invention, since the branch semicylindrical member 9 for protecting the branch wire is firmly secured to the branch portion 4b of the T-shaped semicylindrical member 4 by means of a pair of clinch projection member and clinch recessed member, the junction point of the T-shaped branch wire protector can be reinforced against external force applied thereto via the wire bundle, thus preventing the protector from being bent or damaged.

What is claimed is:

1. A branch wire protector comprising:
   (a) a T-shaped semicylindrical member having a trunk portion and a branch portion;
   (b) a trunk semicylindrical member openably joined to the trunk portion of said T-shaped semicylindrical member and having a semicylindrical base portion near a junction point of the trunk portion and the branch portions;
   (c) a branch semicylindrical member openably joined to the branch portion of said T-shaped semicylindrical member;
   (d) locking members for locking said trunk semicylindrical member and said branch semicylindrical member to said T-shaped semicylindrical member; and
   (e) means for clinching said branch semicylindrical member to said trunk semicylindrical member near the junction point of the trunk portion and the branch portion of said T-shaped semicylindrical member.

2. The branch wire protector as set forth in claim 1, wherein said clinching means comprises;
   (a) a clinch projection member formed at an inner end surface of said branch semicylindrical member; and (b) a clinch hole formed in the semicylindrical base portion of said trunk semicylindrical member.

3. The branch wire protector as set forth in claim 2, wherein said clinch projection member is formed extending over an entire semicircular circumference of said branch semicylindrical member and said clinch hole is formed extending over an entire semicircular circumference of the semicylindrical base portion of said trunk semicylindrical member.

4. The branch wire protector as set forth in claim 2, wherein said clinch hole is an U-shaped groove formed at the base portion of said trunk semicylindrical member.

5. The branch wire protector as set forth in claim 2, wherein said clinch projection member is an L-shaped clinch projection member and said clinch hole is a stepped hole formed in the semicylindrical base portion of said trunk semicylindrical member.

* * * * *